United States Patent
Wang

(10) Patent No.: US 8,319,765 B2
(45) Date of Patent: Nov. 27, 2012

(54) SYSTEM AND METHOD FOR ADJUSTING VIEW ANGLE OF DISPLAY

(75) Inventor: Cho-Hao Wang, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 517 days.

(21) Appl. No.: 12/604,339

(22) Filed: Oct. 22, 2009

(65) Prior Publication Data
US 2011/0069079 A1    Mar. 24, 2011

(30) Foreign Application Priority Data
Sep. 23, 2009 (CN) .......................... 2009 1 0307493

(51) Int. Cl.
*G09G 5/00* (2006.01)
(52) U.S. Cl. ........................... 345/207; 345/204; 345/10
(58) Field of Classification Search .................... None
See application file for complete search history.

(56) References Cited

U.S. PATENT DOCUMENTS

| | | | |
|---|---|---|---|
| 4,475,705 A * | 10/1984 | Henneberg et al. | 248/447.2 |
| 4,704,603 A * | 11/1987 | Edwards et al. | 340/674 |
| 5,757,127 A * | 5/1998 | Inoguchi et al. | 313/507 |
| 6,339,429 B1 * | 1/2002 | Schug | 345/589 |
| 6,348,928 B1 * | 2/2002 | Jeong | 345/649 |
| 6,742,901 B2 * | 6/2004 | Kimura et al. | 353/122 |
| 6,931,596 B2 * | 8/2005 | Gutta et al. | 715/728 |
| 7,019,276 B2 * | 3/2006 | Cloutier et al. | 250/214 AL |
| 7,876,304 B2 * | 1/2011 | Lee | 345/102 |
| 2002/0196175 A1 * | 12/2002 | Autio et al. | 342/20 |
| 2005/0030271 A1 * | 2/2005 | Liu | 345/89 |
| 2007/0180129 A1 * | 8/2007 | Tolmie et al. | 709/230 |
| 2007/0210223 A1 * | 9/2007 | Lee et al. | 248/178.1 |
| 2009/0174658 A1 * | 7/2009 | Blatchley et al. | 345/158 |
| 2010/0188324 A1 * | 7/2010 | Ohashi et al. | 345/102 |

* cited by examiner

*Primary Examiner* — James A Thompson
*Assistant Examiner* — David H Chu
(74) *Attorney, Agent, or Firm* — Altis Law Group, Inc.

(57) ABSTRACT

A system for adjusting a view angle of a display can automatically adjust a view angle of the display to prevent lights from reflecting on the display. A plurality of sensors detect light intensities of a plurality of directions around the display, and send the detected light intensities to an adjusting device. The adjustment device calculates the light intensities to get a sum and an average of the light intensities, and controls the view angle of the display to be turned a corresponding degree in response to light intensities of some directions being greater than the average and a preset value.

8 Claims, 2 Drawing Sheets

SYSTEM AND METHOD FOR ADJUSTING VIEW ANGLE OF DISPLAY

BACKGROUND

1. Technical Field

The present disclosure relates to a system and a method for adjusting a view angle of a display.

2. Description of Related Art

Currently, various display devices, such as television displays, computer displays, etc., mostly provide flat surfaces. When a user is viewing images on a flat display device, surrounding lights may reflect on the display device and cause uncomfort to the user's eyes. Moreover, most display devices only focus on appearance of having an appealing visual effect but lack view angle adjustment. Therefore, the user may need to manually adjust the view angle of the display device to reduce the reflective lights, thereby causing inconvenience for the user.

DETAILED DESCRIPTION

Figure 1:
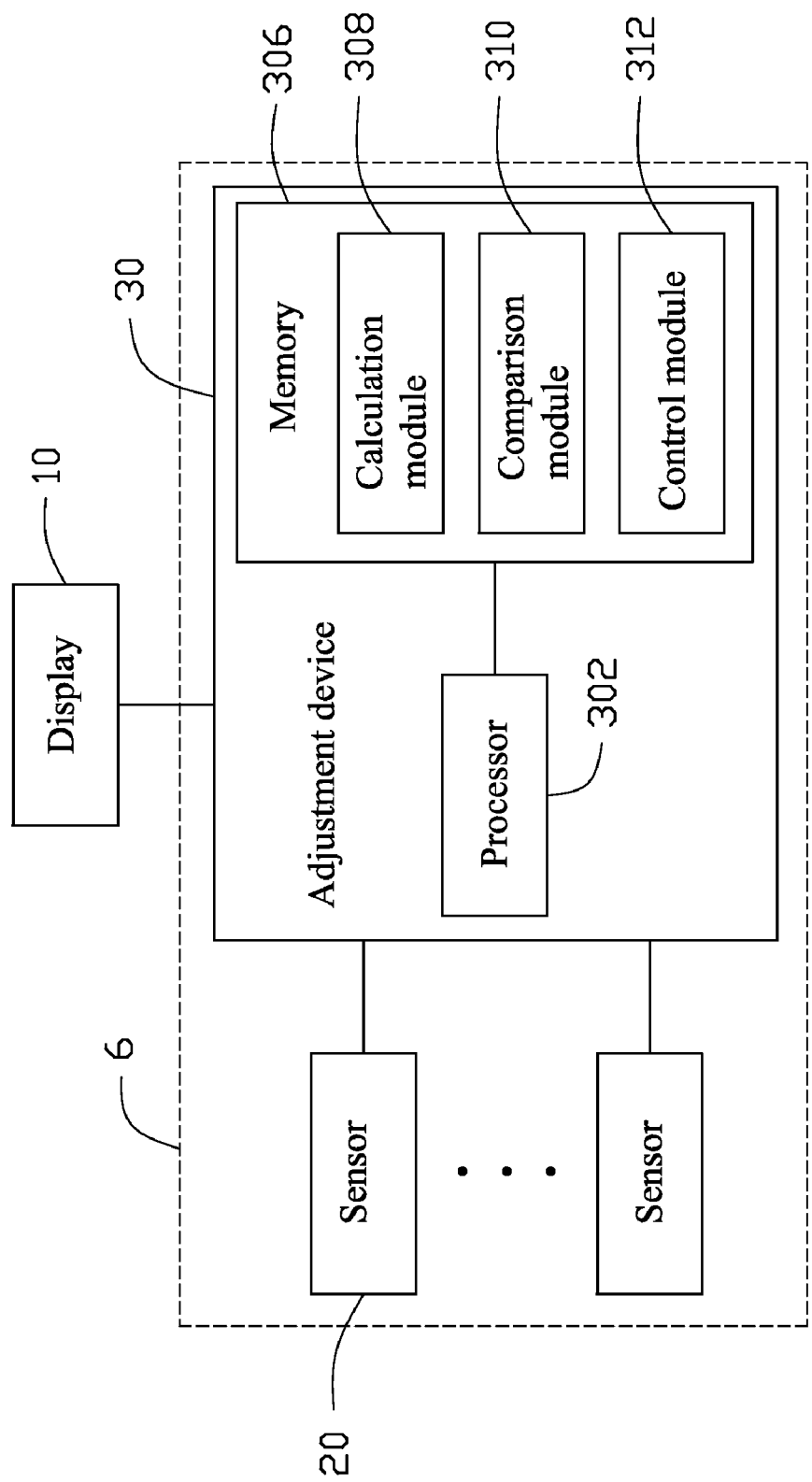
FIG. 1 is a block diagram of an exemplary embodiment of a system for adjusting a view angle of a display.

Referring to FIG. 1, an exemplary embodiment of a system 6 for adjusting a view angle of a display 10 includes a plurality of sensors 20 mounted on the display 10, and an adjustment device 30 connected to the plurality of sensors 20 and the display 10. In one embodiment, the display 10 may be rectangular-shaped, the number of the plurality of sensors 20 are four and each sensor 20 may be arranged on a middle of each edge of the display 10 or on each corner of the display 10, and the plurality of sensors 20 may be light sensitive sensors. In other embodiments, the number of the plurality of sensors 20 can be changed, and can be located at other places of the display 10.

The adjustment device 30 includes a processor 302 and a memory 306. The processor 302 is connected to the memory 306. The memory 306 includes a calculation module 308, a comparison module 310, and a control module 312, each of which stores one or more computerized instructions to be executed by the processor 302.

The plurality of sensors 20 detect light intensities of a plurality of directions (e.g., a top right direction, a top left direction, a bottom left direction, and a bottom right direction of the display 10 or a middle of each edge of the display 10) around the display 10 at an interval, such as every 30 minutes, and send the detected light intensities to the calculation module 308.

The calculation module 308 calculates the light intensities to get a sum and an average of the light intensities.

The comparison module 310 determines whether the light intensities of the plurality of directions are greater than the average of the light intensities and a preset value, for example, stored in the memory 306. If the light intensities of some directions are greater than the average and the preset value, the comparison module 310 calculates how many degrees (e.g., 7 degrees) of view angles of the display 10 need to be turned towards the directions. In this embodiment, a method to calculate how many degrees of view angles of the display 10 need to be turned towards the directions is as follows. For example, if the light intensity of one direction is greater than the average (e.g., n) and the preset value, the display 10 needs to turn towards the direction $2n$ degrees. If the light intensities of two opposite directions, such as left and right of the display 10 are greater than the average and the preset value, for example, the light intensity of the left of the display 10 is three degrees greater than the average, indicating that the left of the display 10 needs to turn six degrees, the light intensity of the right of the display 10 is five degrees greater than the average, indicating that the right of the display 10 needs to turn ten degrees. A degree difference of turned view angles between the left and the right of the display 10 is 4 degrees, which means the display 10 needs to turn 4 degrees towards right. The maximum degrees of view angles which the display 10 can turn are preset at a certain value, e.g., 25 degrees, from an initial degree of a view angle of the display 10.

The control module 312 controls the display 10 to turn a corresponding view angle.

Figure 2:
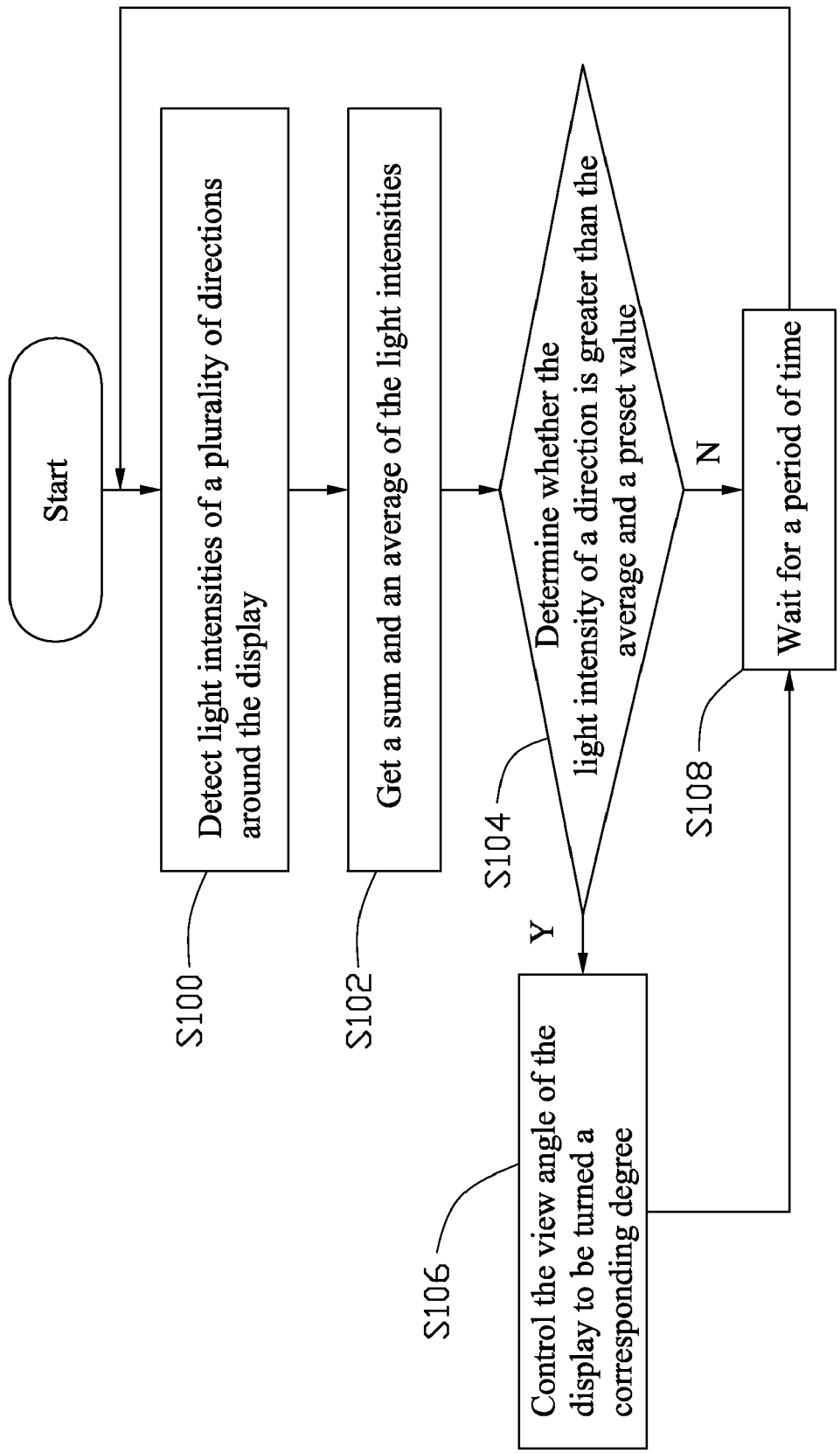
FIG. 2 is a flowchart of an exemplary embodiment of a method for adjusting a view angle of a display.

FIG. 2 is a flowchart of an exemplary embodiment of a method for adjusting the view angle of the display 10. The method includes the following steps.

In step S100, the plurality of sensors 20 detect light intensities of a plurality of directions (e.g., a top right direction, a top left direction, a bottom left direction, and a bottom right direction of the display 10 or a middle of each edge of the display 10) around the display 10, and send the detected light intensities to the calculation module 308.

In step S102, the calculation module 308 calculates the light intensities to get a sum and an average of the light intensities.

In step S104, the comparison module 310 determines whether the light intensities of the plurality of directions are greater than the average and a preset value. If the light intensities of some directions are greater than the average and the preset value, the procedure goes to step S106. If the light intensities of all directions are not greater than the average and the preset value, the procedure goes to step S108.

In step S106, the comparison module 310 calculates how many degrees of the view angles of the display 10 need to be turned towards the directions. The control module 312 controls the display 10 to turn a corresponding degree. If light intensities of a first direction and a second direction opposite to the first direction of the display 10 are greater than the average and the preset value, and a first degree of the view angle towards the first direction needing to be turned is greater than a second degree of the view angle towards the second direction of the display 10 needing to be turned, the display 10 needs to turn a degree difference towards the first direction. If the first degree of the view angle towards the first direction of the display 10 needing to turn is equal to the second degree of the view angle towards the second direction of the display 10 needing to be turned, the display 10 remain unturned.

In step S108, the procedure returns to step S100 after a period of time, such as 30 minutes.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A system for adjusting a view angle of a display, the system comprising:

a plurality of sensors mounted on the display, to detect light intensities of a plurality of directions around the display at an interval, and output the light intensities; and an adjustment device connected to the plurality of sensors and the display, the adjustment device comprising a processor and a memory connected to the processor, the memory comprising a plurality of modules each of which stores one or more computerized instructions to be executed by the processor, wherein the plurality of modules comprises:

a calculation module to receive the light intensities and calculate the light intensities to get a sum and an average of the light intensities;

a comparison module to determine whether the light intensity of each of the plurality of directions is greater than the average and a preset value, and calculate how many degrees of view angle towards the direction of the display need to be turned according to a difference between the average of the light intensities and the light intensity of the direction in response to the light intensity of the direction being greater than the average and the preset value; and a control module to control the view angle of the display to be turned a corresponding degree according to the determination of the comparison module.

2. The system of claim 1, wherein each sensor is arranged on a middle of each edge of the display.

3. The system of claim 1, wherein each sensor is arranged on each corner of the display.

4. The system of claim 1, wherein if a first degree of the view angle towards a first direction needing to be turned is greater than a second degree of the view angle towards a second direction opposite to the first direction of the display needing to be turned, the control module controls the view angle towards the first direction of the display to be turned a degree difference between the first and the second directions, in response to light intensities of the first direction and the second direction being greater than the average and the preset value and the light intensity of the first direction is greater than that of the second direction, and vice versa; wherein the view angles of the display remain unchanged in response to the first degree of the view angle towards the first direction needing to be turned being equal to the second degree of the view angle towards the second direction of the display needing to be turned.

5. A method for adjusting a view angle of a display, the method comprising:

detecting light intensities of a plurality of directions around the display, and outputting the light intensities, by a plurality of sensors mounted on the display;

calculating the light intensities to get a sum and an average of the light intensities; and determining whether the light intensity of each of the plurality of directions is greater than the average and a preset value, calculating how many degrees of view angle towards the direction of the display need to be turned according to a difference between the average and the light intensity of the direction in response to the light intensity of the direction being greater than the average and the preset value, and controlling the view angle of the display to be turned a corresponding degree.

6. The method of claim 5, wherein each sensor is arranged on a middle of each edge of the display.

7. The method of claim 5, wherein each sensor is arranged on each corner of the display.

8. The method of claim 5, wherein if a first degree of the view angle towards a first direction needing to be turned is greater than a second degree of the view angle towards a second direction opposite to the first direction of the display needing to be turned, the control module controls the view angle towards the first direction of the display to be turned a degree difference between the first and the second directions, in response to light intensities of the first direction and the second direction being greater than the average and the preset value and the light intensity of the first direction is greater than that of the second direction, and vice versa; wherein the view angles of the display remain unchanged in response to the first degree of the view angle towards the first direction needing to be turned being equal to the second degree of the view angle towards the second direction of the display needing to be turned.

* * * * *